United States Patent [19]

Cataldo

[11] 4,446,821

[45] May 8, 1984

[54] INTERNAL COMBUSTION ENGINE METHOD FOR DELAYED REACTION STRATIFIED COMBUSTION

[75] Inventor: Roy S. Cataldo, Birmingham, Mich.

[73] Assignee: General Motors Corporation, Detroit, Mich.

[21] Appl. No.: 341,114

[22] Filed: Jan. 20, 1982

[51] Int. Cl.³ ............................................. F02B 41/00
[52] U.S. Cl. ..................................... 123/26; 123/432; 123/568
[58] Field of Search .................... 123/26, 169 V, 302, 123/303, 308, 430, 432, 531, 532, 533, 534, 568

[56] References Cited

U.S. PATENT DOCUMENTS

| | | | |
|---|---|---|---|
| 1,645,170 | 10/1927 | Whaley | 123/26 |
| 1,904,775 | 4/1933 | Bartholomew | 123/26 |
| 2,673,554 | 3/1954 | Thaheld | 123/26 |
| 2,766,737 | 10/1956 | Sprinzing | 123/26 |
| 2,994,310 | 8/1961 | Hopwood | 123/26 |
| 3,814,065 | 6/1974 | Gospodar | 123/26 |
| 4,060,061 | 11/1977 | Might | 123/26 |

Primary Examiner—Parshotam S. Lall
Assistant Examiner—W. R. Wolfe
Attorney, Agent, or Firm—Robert J. Outland

[57] ABSTRACT

A method of delayed reaction stratified combustion for internal combustion engines comprising burning a compressed fast burning rich air-fuel mixture during an initial portion of a combustion event, adding supplemental diluting air optimally with recirculated exhaust gas (EGR) during an intermediate portion of such combustion event and completing combustion during latter portions of the combustion event. Suggested timing and mixture ratios may be chosen to obtain improved efficiency, reduced $NO_x$ formations and/or reduced requirement for egr.

6 Claims, 4 Drawing Figures

INTERNAL COMBUSTION ENGINE METHOD FOR DELAYED REACTION STRATIFIED COMBUSTION

TECHNICAL FIELD

This invention relates to combustion in internal combustion engines and more particularly to a combustion method which I have named delayed reaction stratified combustion.

BACKGROUND

Among various types of stratified charge or stratified combustion engines are those of ignition chamber or prechamber design wherein a small prechamber is fed a rich mixture that is subsequently ignited and a connecting main chamber is supplied with air or very lean mixture. The stratified combustion process in such engines may be considered as instantaneous reaction since, upon ignition, the products of rich combustion issuing from the prechamber immediately mix and react with unreacted constituents of the main chamber.

The consequence of this sequence of reactions in terms of formation of nitrogen oxides ($NO_x$) is not optimum since the products in the main chamber always pass through the slightly lean air-to-fuel ratio (approximately 16:1) in which maximum $NO_x$ is produced. Further, the effect of injecting the burning charge of rich mixture into the cold main body of lean mixture or air is to cool or quench the combustion reaction so that the combustion event and the time occupied in burning in the region of maximum $NO_x$ are extended, increasing the total $NO_x$ formation. An example of the air/fuel ratios present in the main chamber of an engine of this type during combustion is shown in FIG. 1 wherein the ratios begin at infinity and are subsequently enriched during combustion to approximately a stoichiometric air/fuel ratio of 14.7:1.

SUMMARY OF THE INVENTION

The present invention utilizes an open chamber stratified charge engine and proposes a method of combustion therein that avoid excessive quenching of burning mixture and eliminates or minimizes the effects of combustion of air-fuel mixture in the region of maximum $NO_x$ formation. The method provides for the injection of supplemental air into a rapidly burning rich main chamber mixture during an intermediate portion of the combustion event in a manner that avoids quenching the burning mixture and instead aids its rapid combustion so that the time of combustion in a region of maximum $NO_x$ production is minimized. Further, if the overall air/fuel ratio is limited to stoichiometric, the region of maximum $NO_x$ formation is never traversed. Such a combustion reaction in accordance with the invention is shown, for example, in FIG. 2.

The consequence of a combustion method in accordance with the invention, which I have termed a delayed reaction stratified combustion method, is the ability to operate at reduced levels of $NO_x$ formation for the same amount of exhaust gas recirculation or at the same levels of $NO_x$ formation with far less exhaust gas recirculation than with homogeneous or conventional stratified charge combustion methods thereby permitting higher mean effective pressures and, thus, improved power and stability of combustion.

The delayed reaction stratified combustion engine concept may be carried out by adding a small third valve to the conventional engine cylinder arrangement and providing a small compressor for supplying air, or air and recirculated exhaust gases, to the combustion chambers at specifically controlled points of the combustion cycle. The cylinders are metered rich having for example, a 10.5:1 air/fuel ratio, which provides easy ignition with rapid combustion at a relatively low rate of production of nitrogen oxides. A diluent, such as air, or preferably air plus recirculated exhaust gas, is compressed in the compressor and injected into the cylinder through the third valve during an intermediate portion near the middle third of the combustion event so that the overall mixture products are diluted by the added air to a desired air/fuel ratio, such as stoichiometric, while an additional desired amount of recirculated exhaust gas is also included.

Computer simulated comparisons of my delayed reaction stratified combustion method with the conventional homogeneous combustion and instantaneous reaction stratified combustion methods have shown the capability of my method to provide more efficient rapid and stable combustion with equivalent levels of exhaust gas recirculation and $NO_x$ production or reduced levels of either or both of the latter. These and other features and advantages of the invention will be more fully understood from the following description of certain preferred embodiments taken together with the accompanying drawings.

BRIEF DRAWING DESCRIPTION

DETAILED DESCRIPTION

Figure 1:
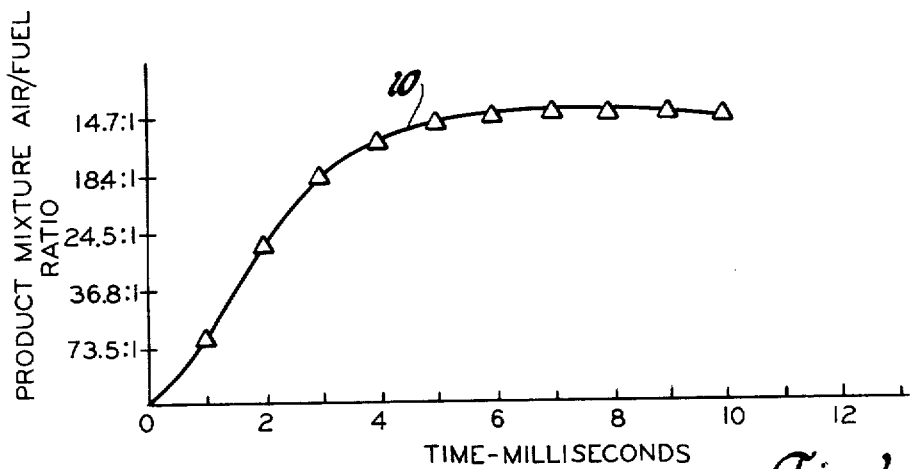
FIG. 1 is a graphical presentation of air/fuel ratio versus time during combustion in the main combustion chamber of an exemplary conventional instantaneous reaction stratified combustion engine.
Figure 2:
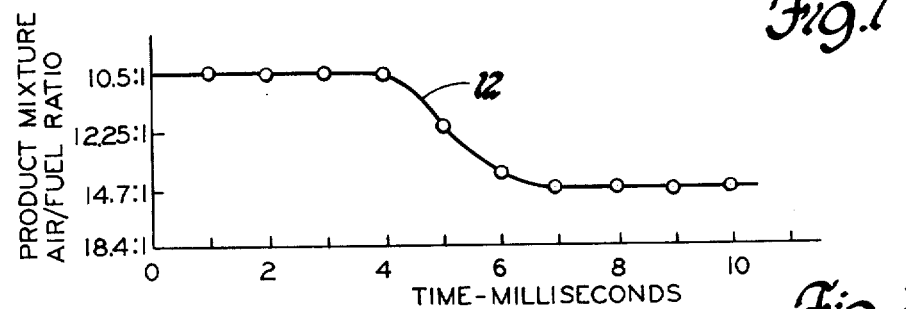
FIG. 2 is a graphical presentation of air/fuel ratio versus time in an exemplary combustion event of a delayed reaction stratified combustion engine in accordance with the invention.

FIGS. 1 and 2 of the drawings are comparative graphical presentations of the combustion chamber air/fuel ratios during exemplary combustion events in the main chambers respectively of a conventional instantaneous reaction stratified combustion engine and a delayed reaction stratified combustion engine according to the invention.

In FIG. 1, line 10 illustrates the increasing enrichment versus time of the mixture in the main chamber, from undiluted air at the beginning of the combustion event to a stoichiometric ratio, as burning mixture from the stratified charge engine prechamber is injected into the main chamber during the combustion event. It is seen that, at the indicated elapsed time of about 4 milliseconds into the combustion event, the air/fuel ratio passes through the slightly lean air/fuel ratio of about 16:1 which is in the region of maximum formation of nitrogen oxides. Note that this air/fuel ratio occurs relatively early in the combustion event, when combustion is occurring at a maximum rate. Further, the overall rate of combustion is somewhat slowed by the quenching effect on the injected burning mixture of the body of relatively cool air or lean mixture into which the burning fuel elements are injected.

In comparison, line 12 of FIG. 2 illustrates the air/fuel ratio versus time for an exemplary combustion event of an engine practicing the delayed reaction stratified combustion method of the present invention. Here the initial air/fuel ratio in the main chamber is rich having, specifically a 10.5:1 air/fuel ratio, which may alternatively be expressed as a fuel/air equivalence ratio of substantially 1.4.

In this example, combustion is initiated and takes place at the initial rich air/fuel ratio for about the first third of the combustion event, or for not less than the first thirty percent thereof. Thereafter, a diluent such as air, or preferably air mixed with recirculated exhaust gases, is injected into the main combustion chamber during a period occupying about the middle third of the combustion event, or over a period occupying at least 25 but not more than about 60 percent of the time of the combustion event.

In the illustrated example, the injection of air starts shortly before the 4 millisecond point and is substantially completed at about 7 milliseconds after the beginnning of combustion. During this period, the air/fuel ratio within the main combustion chamber is made increasingly leaner to a predetermined end point which, in the illustrated example, is approximately stoichiometric, that is 14.7:1 air/fuel ratio or a fuel/air equivalence ratio of 1.

Injection of the elements of air into the hot mass of rapidly burning rich mixture does not have the same quenching effect as the reverse process in the conventional stratified combustion cycle previously described, since the mass of the body of burning gas is so great compared to the relatively small elements of cooler diluent injected therein that these elements of injected diluent are rapidly heated to take their place in the combustion reaction as further elements of diluent continue to be injected. It can be seen that, in the illustrated example, combustion in the main chamber never reaches the point of lean combustion at the approximately 16 to 1 air/fuel ratio level wherein maximum $NO_x$ production is experienced. Instead combustion is completed at approximately a stoichiometric ratio with burning being substantially complete at 10 milliseconds after the initiation of combustion.

It should be understood, however, that the delayed reaction combustion method may be practiced with varying amounts of diluent which may include air and a desired amount of recirculated exhaust gases from zero to any practical amount. Thus, if desired, the method may provide for the initial rich combustion mixture to be diluted beyond stoichiometric to a selected level of lean combustion. In such an event, combustion in the main chamber may pass through the 16 to 1 air/fuel ratio at which maximum $NO_x$ is formed. However, this condition will be reached at a substantially later point in the combustion cycle wherein the combustion reaction is much more fully complete than the comparative point in the conventional instantaneous reaction stratified combustion method so that a lower level of $NO_x$ formation is anticipated.

Reviewing the important aspects of the present combustion cycle, it should be noted that a substantial portion of the initial combustion in the main chamber occurs at a predetermined level of rich air/fuel ratio sufficient to provide rapid combustion with relatively low production of nitrogen oxides. Subsequently, during an intermediate portion of the combustion event, a diluent such as air or air and exhaust gases is introduced which provides the necessary oxygen to complete combustion and dilutes the burning mixture to a stoichiometric air/fuel ratio or, if desired, a leaner ratio. Injection of the air further accelerates combustion by providing the needed oxygen for burning the excess fuel supplied with the initial rich mixture as well as by creating turbulence in the burning mixture which increases the combustion rate. Subsequently, combustion of the mixture is completed at the final air-fuel mixture reached upon completion of injection of the timed controlled quantity of diluent, combustion of the diluted mixture being completed during the latter portion not exceeding 70 percent of the respective combustion event.

Figure 3:
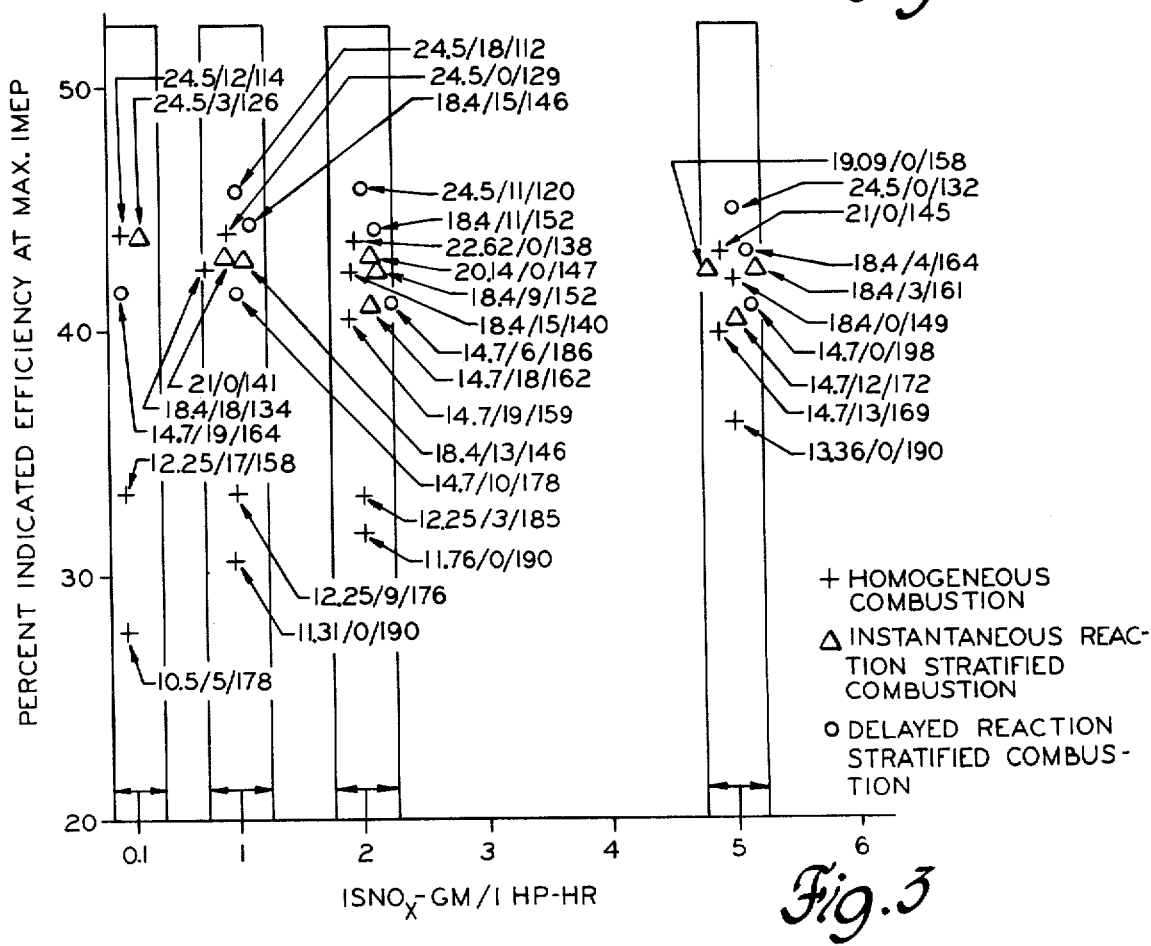
FIG. 3 is a graphical presentation of computer simulated combustion results for both conventional engines and engines in accordance with the invention.

Referring now to FIG. 3 of the drawings, there are shown the results of computer assisted calculation of comparative operating conditions for comparable engines operating with conventional homogeneous combustion, conventional instantaneous reaction stratified combustion and the present invention of delayed reaction stratified combustion. The figure plots percent indicated efficiency at maximum indicated mean effective pressure against indicated specific $NO_x$ in grams per indicated horsepower-hour under various operating conditions considered. These conditions are shown at the various data points by legends listing the overall exhaust air/fuel ratio/the percent recirculated exhaust gas/and the maximum indicated mean effective pressure in psi. In these calculations, the delayed reaction stratified combustion method was performed according to the example given in FIG. 2. From the data indicated in FIG. 3, it may be seen that the delayed reaction stratified combustion method of the present invention is capable of providing higher indicated efficiencies and/or lower levels of recirculated exhaust gas and $NO_x$ formation than comparable conditions of conventional homogeneous combustion or instantaneous reaction stratified combustion.

Figure 4:
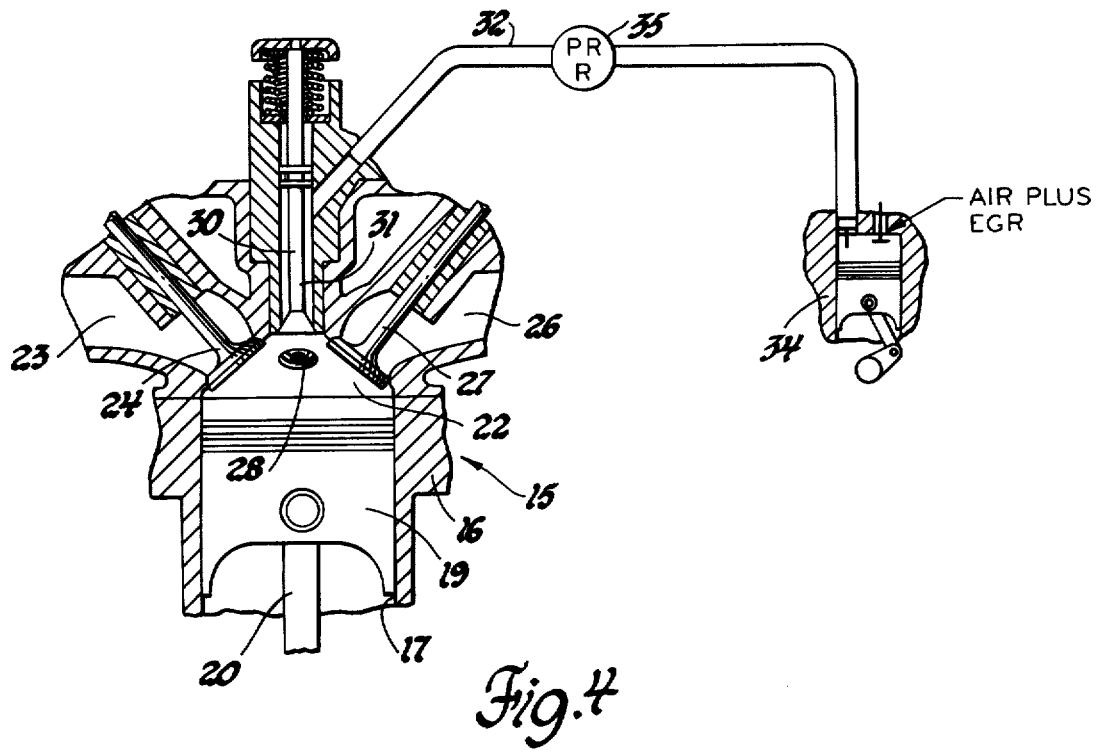
FIG. 4 is a partially schematic representation of an engine arrangement suitable for practicing the delayed reaction stratified combustion method of the present invention.

In FIG. 4, there is illustrated an exemplary engine, generally indicated by numeral 15, capable of providing operation according to the delayed reaction stratified combustion method of the present invention. Engine 15 includes a cylinder block 16 having a plurality of cylinders 17, only one of which is shown. Pistons 19 are reciprocably disposed in the cylinders and connected by connecting rods 20 with a crankshaft, not shown. The upper end of each cylinder 17 is closed to form a variable volume combustion chamber 22.

An inlet port 23 and inlet valve 24 provide means for admitting to the combustion chamber 22 a primary charge of rich air-fuel mixture supplied by suitable means such as a carburetor, not shown. An exhaust port 26 and exhaust valve 27 provide means for exhausting burned products from the combustion chamber in conventional manner. A spark plug 28 provides means for igniting the rich primary mixtures delivered to the combustion chamber through the inlet port.

The engine also includes means to provide secondary inlet charges to the combustion chamber including a secondary inlet port 30 controlled by a secondary inlet valve 31 and connected by a conduit 32 with a compressor 34. The compressor is operated by the engine or otherwise to supply the secondary inlet port with compressed diluents such as air or air plus recirculated exhaust gas (egr) a pressure regulator 35 in the line 32 controls the pressure of the diluent supplied to the secondary inlet port. Suitable means, not shown, are provided for actuating the valves and the spark plug in timed relation to provide in the engine combustion chamber 22 a combustion cycle in accordance with the delayed reaction stratified combustion method previously described.

In operation, the engine piston reciprocates in the cylinder on a 4 stroke cycle including intake compression, expansion and exhaust strokes. On the intake stroke, a primary charge of rich air-fuel mixture having a predetermined fuel/air equivalence ratio which is preferably 1.4 is drawn into the main combustion chamber 22. This mixture is compressed on the piston compression stroke and ignited by the spark plug near the end of the compression stroke.

Rapid combustion then begins during which a substantial portion of the fuel is burned in a very short interval occupying approximately the first third of the total elapsed time of the combustion event. During this event the valve 31 is actuated, causing the injection of supplemental air or air and exhaust gas during an intermediate portion occupying approximately the central third of the elapsed time of the total combustion event. The amount of air injected is controlled to provide a final overall air/fuel ratio within the combustion chamber of a desired fuel/air equivalence ratio which may preferably be one.

Combustion continues and is completed in a relatively short time interval during which the piston begins to move downwardly on its expansion stroke developing power. Thereafter, the exhaust valve opens and the piston moves upwardly expelling the burned gases in conventional manner.

The practice of the present invention, involving the time injection of controlled amounts of diluents including air into a rich main cylinder charge during an intermediate portion of each combustion event, provides advantages over known combustion methods as has been described in the foregoing specification. While the invention has been described by reference to certain preferred embodiments, it should be understood that numerous changes could be made within the scope of the inventive concepts disclosed. Accordingly it is intended that the invention not be limited except in accordance with the language of the following claims.

The embodiments of the invention in which an exclusive property or privilege is claimed are defined as follows:

1. A delayed reaction stratified combustion method of operating an engine having a variable volume combustion chamber in which combustible fuel-air mixtures are burned to produce power, inlet means for separately supplying primary and secondary inlet charges to said combustion chamber, means for igniting the primary charges and exhaust means for exhausting the burned products, said method comprising supplying to the combustion chamber and compressing therein without substantial dilution primary charges of rich fuel-air mixture having a sufficient excess of fuel over a stoichiometric value to provide when ignited rapid combustion with relatively low production of nitrogen oxides, igniting and partially burning said compressed primary charges during initial portions of sequential combustion events, said initial portions extending over essentially the first third of the elapsed time of their respective combustion events, then, during subsequent intermediate portions extending over essentially the central third of their respective combustion events, supplying supplemental charges of oxidizing and diluting gas to the burning primary charges in amount sufficient to provide for the substantial completion of combustion during essentially the latter two thirds of the respective combustion events by continued rapid combustion with increasingly diluted mixtures, and expanding the combustion chamber volume during and subsequent to said combustion events whereby a high efficiency, low $NO_x$ power producing combustion cycle is provided.

2. A delayed reaction stratified combustion method of operating an engine having a variable volume combustion chamber in which combustible fuel-air mixtures are burned to produce power, inlet means for separately supplying primary and secondary inlet charges to said combustion chamber, means for igniting the primary charges and exhaust means for exhausting the burned products, said method comprising supplying to the combustion chamber and compressing therein without substantial dilution primary charges of rich fuel-air mixture having a sufficient excess of fuel over a stoichiometric value to provide when ignited rapid combustion with relatively low production of nitrogen oxides, igniting and partially burning said compressed primary charges during initial portions of sequential combustion events, said initial portions extending over at least 30 percent of the elapsed time of their respective combustion events, then, during subsequent intermediate portions extending over at least 25 percent but not more than 60 percent of their respective combustion events, supplying supplemental charges of oxidizing and diluting gas to the burning primary charges in amount sufficient to provide for the substantial completion of combustion during essentially the latter portion not exceeding 70 percent of the respective combustion events by continued rapid combustion with increasingly diluted mixtures, and expanding the combustion chamber volume during and subsequent to said combustion events whereby a high efficiency, low $NO_x$ power producing combustion cycle is provided.

3. The method of claim 2 wherein said primary charges of rich fuel-air mixture have a fuel/air equivalence ratio in the range of from 1.3 to 1.5 and the amounts of said supplemental charges of oxidizing and diluting gas are such as to reduce the overall fuel/air equivalence ratio to at most substantially 1.0 and not less than 0.95.

4. A delayed reaction stratified combustion method of operating an engine having a variable volume combustion chamber in which combustible fuel-air mixtures are burned to produce power, inlet means for separately supplying primary and secondary inlet charges to said combustion chamber, means for igniting the primary charges and exhaust means for exhausting the burned products, said method comprising:

supplying to the combustion chamber and compressing therein without substantial dilution primary charges of rich fuel-air mixture having a fuel/air equivalence ratio of substantially 1.4 comprising a sufficient excess of fuel over a stoichiometric value to provide when ignited rapid combustion with relatively low production of nitrogen oxides, igniting and partially burning said compressed primary charges during initial portions of sequential combustion events, said initial portions extending over at least 30 percent of the elapsed time of their respective combustion events, then, during subsequent intermediate portions extending over at least 25 percent but not more than 60 percent of their respective combustion events, supplying supplemental charges of oxidizing and diluting gas comprising at least air to the burning primary charges in amount sufficient to provide for the substantial completion of combustion during essentially the latter portion not exceeding 70 percent of the respective combustion events by continued rapid combustion with increasingly diluted mixtures, and expanding the combustion chamber volume during and subsequent to said combustion events whereby a high efficiency, low $NO_x$ power producing combustion cycle is provided.

5. The method of claim 4 wherein said supplemental charges of oxidizing and diluting gas include recirculated exhaust gases mixed with said air.

6. The method of claim 4 wherein the supplied amounts of said supplemental charges of oxidizing and diluting gas are such as to reduce the overall fuel/air equivalence ratio to substantially 1.0.

* * * * *